United States Patent [19]
Leighton

[11] 3,733,132
[45] May 15, 1973

[54] COLLIMATOR FOR BINOCULAR INSTRUMENTS

[75] Inventor: Stephen Beecher Leighton, Silver Spring, Md.

[73] Assignee: The United States of America as represented by the Secretary of the Department of Health, Education and Welfare, Washington, D.C.

[22] Filed: Oct. 26, 1971

[21] Appl. No.: 192,267

[52] U.S. Cl. ............... 356/138, 356/153, 356/154, 350/35, 350/169
[51] Int. Cl. ............................................. G01b 11/26
[58] Field of Search ................... 356/138, 152, 153, 356/154; 350/35

[56] References Cited
UNITED STATES PATENTS

| | | |
|---|---|---|
| 3,418,032 | 12/1968 | Kajiro .................................. 350/35 |
| 2,365,361 | 12/1944 | Street .................................. 356/154 |
| 3,012,475 | 12/1961 | Zakewski ........................... 356/154 |
| 2,764,908 | 10/1956 | Hendrix et al. ................... 356/138 |

*Primary Examiner*—Ronald L. Wibert
*Assistant Examiner*—Paul K. Godwin
*Attorney*—Alvin Browdy et al.

[57] ABSTRACT

A precise system for aligning the beam splitting system such as the prisms of a binocular instrument. A beam of collimated light passes through a hole in a screen to a flat mirror and returns coincident with itself to the screen. When the beam splitter to be checked is placed in the path of the light, two rays are formed. These rays travel to the flat mirror and return to the screen through the beam splitter. Any non-parallelism of the rays is indicated by light spots not centered on the screen.

8 Claims, 4 Drawing Figures

PATENTED MAY 15 1973  3,733,132
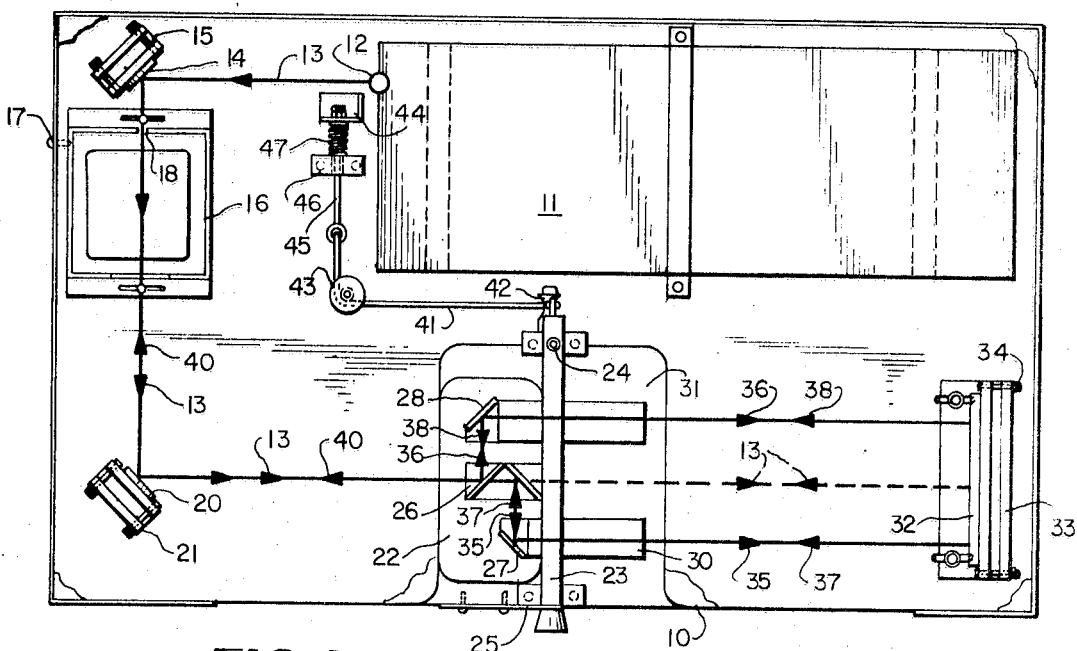
FIG. 1
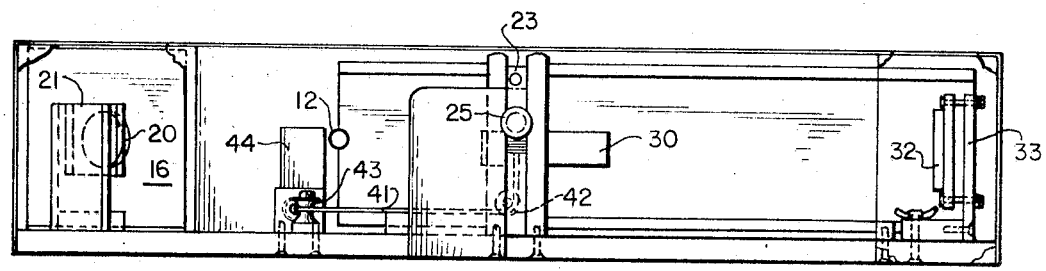
FIG. 2
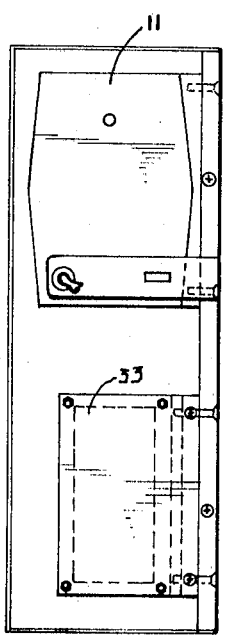
FIG. 3
FIG. 4
INVENTOR
Stephen Bucker Leighton
BY Brady and Neimark
ATTORNEYS

COLLIMATOR FOR BINOCULAR INSTRUMENTS

FIELD OF THE INVENTION

The present invention relates to optical aligning systems and, more particularly, to an optical aligning device and method used to adjust and align the beam splitting system of prisms employed in binocular microscopes and binoculars.

BACKGROUND OF THE INVENTION

Binocular instruments, as the name implies, are characterized by two separate ocular systems — one for each of the viewer's eyes — and frequently by two entirely separate optical trains having duplicate ocular, intermediate and objective elements.

In order for such instruments to function properly, it is essential that the duplicated portions of the system be optically equivalent with respect to magnification, focal length, etc., and also that they be properly collimated, i.e., so oriented that the effective optic axes of the duplicated elements are parallel as presented to the viewer. If the instrument is not properly collimated, it becomes necessary for the viewer to compensate for the defect by orienting his eyes to a slightly "wall-eyed" or "cross-eyed" relationship in order to produce on the retinas a pair of images that can be fused. If the defect in alignment of the instrument is severe, the required compensation will exceed the viewer's ability to accommodate, and he will see separate overlapping images which cannot be made to fuse. If the defect is less pronounced, the viewer will accommodate and see a fused image, and may not even be aware of the misalignment, but nevertheless will experience undue strain of the eye muscles and fatigue, resulting in headaches and other undesirable effects after relatively short periods of use of the instrument.

When the instrument is properly collimated, assuming that the elements are properly matched, the eyes are permitted to remain in the position of rest — i.e. in parallel orientation, as if directed to an object at a great distance.

In the assembly of binocular instruments, it is not particularly difficult to make a pair of equivalent optical trains, which merely requires that the elements — lenses, prisms, etc., be matched as to optical density or refractive index, ground to the same dimensions and curvatures, and assembled at equal spacings. The matching with respect to refractive index is relatively simple in practice, and is most conveniently accomplished in large-scale operations by making the matched elements from the same batch of glass or by suitable controls to insure uniformity among successive batches of glass. There exists automatic or semi-automatic equipment suited to the grinding and assembly operations, and these are readily carried out without undue expenditure of time and skilled effort.

In the collimation, on the other hand, there has to date been no simple inexpensive method whereby the final fine orientation of the optical axes — to make them perfectly parallel — could be carried out rapidly, accurately and inexpensively. This fact in part accounts for the difference in cost between well-made, carefully-collimated instruments and relatively inexpensive ones, even though the latter may have as good optics as the former.

The collimation step is, moreover, essential as a practical matter. If it were possible, indeed, to assemble every element perfectly in its designed position with respect to the rest, there would be no need for collimation; the instrument would be fully aligned on completion of the assembly. In practice, it would be impractical, if not impossible, to make the assembly with such perfection. Moreover, the more complex the system, the more numerous are the possibilities for the cumulation of minute errors into a substantial misalignment.

One method that has been suggested is to accomplish the final alignment by displacing one of the optical elements, for example the objective, in one of the trains without disturbing the position of the assembly as a whole. In one such arrangement, one of the two objectives is placed in a slightly eccentric mount so that it can be displaced laterally away from its normal designed position, and this displacement employed as the means for correcting minor variations in the relative alignment of the axes. This method was designed to overcome the above-mentioned difficulties involved in attempts to align one train as a unit relative to the other, but it introduced additional difficulties. Thus, it involved the introduction of an additional departure from the designed characteristics of the system over and above that for which the adjustment was designed to compensate, and, while correcting the gross effects of misalignment of the axis of the system as a whole, aggravated those errors associated with the misalignment of an individual curved element, such as coma, spherical aberration and astigmatism. For these reasons this method was not entirely effective, and could be used only to correct very small misalignments, which in turn necessitated comparatively great care in the position of the rest of the elements in the system.

SUMMARY

An objective of this invention, therefore, is to provide an improved method and device for collimating binocular optical instruments or for checking the alignment of any beam splitter.

Another objective of the invention is to provide a system which avoids the necessity of disturbing the designed alignment of any of the optical elements of the binocular instrument.

It is another object to overcome deficiencies in the prior art, such as indicated above.

It is another object of the present invention to provide for improved and/or less expensive binocular instruments.

Other objects and advantages will become apparent from the following more complete description, it being understood that the specific embodiment set forth is exemplary.

Broadly, the invention contemplates a method and device for collimating a binocular optical instrument having two optical systems, which comprises passing a beam of collimated light through a screen to a flat mirror so that the beam returns coincident with itself to the screen. When the beam splitter, comprising the prisms and optical system of a binocular microscope, for example, to be checked is placed in the path of the collimated light, two ray paths are formed. These rays travel to the flat mirror and return to the screen through the beam splitter. Any non-parallelism of the rays along their optical axes is indicated by light spots which are not centered on the screen.

BRIEF DESCRIPTION OF DRAWING

FIG. 1 shows a top view of a device of the invention with the cover removed from the container;

FIG. 2 shows a front elevation view of such device;

FIG. 3 shows a left side view of the clamp assembly in the illustrated embodiment; and FIG. 4 shows a right side view of the device.

DETAILED DESCRIPTION OF EMBODIMENT

Referring now to the figures wherein like reference numerals designate like parts throughout the several views thereof, there is shown in FIG. 1 a container 10 to encompass the elements of the device, and which may be substantially rectangular in shape. In one corner of container 10 there is positioned an optical laser 11 with its associated power supply and light generating elements. The laser 11 may be of any well known, commercially available models, such as for example Model 132 manufactured by Spectra Physics. The light emitted may be polarized.

Light is emitted from the laser light source 11 via an aperture 12 in the form of a collimated light beam 13 which travels to a first mirror 14. This mirror 14 has a flat front face and is secured by a suitable mounting 15 at a 45° angle so that the flat face of the mirror turns the beam of light 13 90 degrees from its original path and toward a screen 16. The screen 16 is mounted on container 10 by means of suitable bolts and is provided with an adjusting bolt 17; and has in its center a hole 18 through which beam of light 13 passes before striking a second mirror 20.

Such second mirror 20 is also supported by a suitable mounting 21, and like the first mirror 14 it has a flat front face and is so positioned at 45° to the light beam 13 to turn the beam of light 13 another 90°.

Placed near the second mirror 20 is a clamp 22 for holding a typical binocular head which is to be aligned, the clamp 22 comprising a cross arm 23 which is pivoted at one end by a bolt 24 and is clamped tightly across the binocular head at the other end by a clamp latch 25. The binocular head, as is characteristic of the instrument, has a double prism 26 and two single prisms 27 and 28 so that an object viewed by the device is split by the double prism 26 and presented to two parallel eyepieces 30 and 31 by the single prisms 27 and 28.

Directly behind the clamp 22 and the binocular eyepieces 30 and 31 there is located another large mirror 32 of sufficient size to span the distance between the eyepieces, the mirror 32 also having a flat front face capable of reflecting light back along the same path at which it was received. The mirror 32 is held in place by a mounting block 33 and there are provided adjusting screws 34 in one end of the block to assure that the plane of mirror 32 is precisely normal to the light beam 13 when the binocular head is not in place.

From the view of FIG. 1 it can be clearly seen how the light beams traverse the prisms and are reflected by the mirrors. Thus, light beam 13 from the laser and mirrors 18 and 20 passes through the double prism 26 and is split into beams 35 and 36; when such beams 35 and 36 are reflected by mirror 32 they become beams 37 and 38, which become coincident in passing through double prism 26, also coincident in path to the beam 13 if the prisms are properly aligned.

There is provided a safety feature of a cable and safety shutter arrangement to protect personnel from any injurious effects of the collimated light beam when the binocular head is being fastened or unfastened in the clamp 22. This safety feature consists of a cable 41 attached to the cross arm 23 and which extends around pulleys 42 and 43 and to a safety shutter 44. A small metal rod 45 is fastened to cable 41 and has its other end bolted to shutter 44, the rod passing through a mounting block 46 and a coil spring 47 placed between block 46 and shutter 44. By this safety arrangement it is obvious that when cross arm 23 is manipulated to tighten down on a binocular head to be aligned, the twisting of the arm 23 pulls in on cable 41 thus moving rod 45 to pull in shutter 44 against the action of spiral spring 47 and thereby unblock the beam of light 13 emitting from aperture 12. When no binocular head is in the clamp the reverse action happens and since the cable 41 is loose, the spiral spring urges the shutter 44 across the aperture to block the light beam.

Operation of the device is as follows. Power is turned on optical laser 11 so that it emits a beam of collimated light 13. Light beam 13 passes out of aperture 12 of the laser cabinet and strikes mirror 14 which, having a flat face, turns the beam 90 degrees and toward a screen 16 where it passes through a hole 18 in the screen and onto another mirror 20. Mirror 20, having a flat surface, again turns beam 13 90 degrees and onto a double prism 26 where it is split into beams 35 and 36. Light beams 35 and 36 are now directed through single prisms 27 and 28 so that they form two parallel beams which emerge from eyepieces 30 and 31 of the binocular being aligned.

After passing through eyepieces 30 and 31 light beams 35 and 36 strike the mirror 32 which has a large flat face and which has been carefully adjusted by screw 34 so that its plane is precisely normal to beam 13. Light beams 35 and 36 are then reflected from mirror 32 as beams 37 and 38, again pass through single prisms 27 and 28, and double prism 26, to become coincident as single beam 40. Beam 40 is reflected by mirror 20 and directed to screen 16.

From this structure it is obvious that any misalignment of the eyepieces 30 and 31 of the microscope binocular eyepieces will result in a non-parallelism of the light beams. Thus reflected beams 37 and 38 will not accurately recombine into beam 40 (a single beam) and also when beam 40 is directed toward screen 16 by mirror 20 this non-parallelism is indicated by light spots not being centered on the screen. It may be noted that when no binocular head is in place in clamp 22, the clamp is tightened, then the light beam 13 will strike large mirror 32 and be reflected back along its same axis to be centered on screen 16. As described before, when clamp latch 25 is not tightened, drum 42 is not turned to wind up cable 41 and thereby withdraw safety shutter 44 from across aperture 12.

From the above description of the structure and operation of the invention it is clear that there is disclosed an improved method and device for collimating binocular optical instruments to verify their alignment which is extremely accurate, easy to use, and one which is relatively inexpensive to construct.

Obviously many modifications and variations of the present invention are possible in the light of the above teachings. It is therefore to be understood, that within the scope of the appended claims, the invention may be practiced otherwise than as specifically described; and that modifications and adaptations may be made without departing from the invention.

What is claimed is:

1. A collimator for checking binocular optical instruments comprising
   a source of light and an aperture to form a first narrow light beam;
   a screen, including a hole therein, for the passage therethrough of the first narrow light beam;
   means for clamping a binocular optical instrument in the path along a first optic path of said narrow light beam and wherein said binocular instrument includes light splitting means for dividing the first beam into second and third beams, and directing said second and third beams along their respective optic axes substantially parallel to each other as they exit the binocular instrument; and
   reflecting means for reflecting the second and third beams back along their respective optic axes, whereby they are recombined by said binocular instrument and redirected along said first optic axis toward said screen, and any non-parallelism existing between the second and third beams is visible on said screen.

2. The device of claim 1 wherein the source of light is a laser.

3. The device of claim 2 further comprising a first flat mirror, mounted between said aperture and said screen to change the direction of the centerline of the first beam by 90°.

4. The device of claim 3 further comprising a second flat mirror, mounted between said screen and said clamping means to change the direction of the centerline of the first beam another 90°.

5. The device of claim 4 wherein the light splitting means in said clamped binocular instrument is a double prism, and the means for redirecting said second and third beams are single prisms.

6. The device of claim 4 wherein the reflecting means is a flat mirror, mounted so that its plane is precisely normal to the ideally aligned optical axes of the second and third light beams.

7. The device of claim 6 further including
   a safety shutter for blocking the first light beam; and
   means operated by the clamping means for moving the safety shutter and unblocking the first light beam when a binocular optical instrument is secured by the clamp.

8. A method for checking binocular optical instruments comprising:
   generating a narrow beam of light along a first optic axis passing said beam into a binocular optical instrument and therein splitting said first beam into second and third substantially parallel beams along respective second and third optic axis;
   and passing these beams through the eyepieces of said binocular optical instrument; and
   reflecting the second and third beams respectively back along the second and third optic axes and back through the eyepieces and recombining said beams to a single beam and redirecting said single beam along the first optic axis toward a screen, whereby non-parallelism in the second and third beams is visible on the screen.

* * * * *